(12) United States Patent
Tanke et al.

(10) Patent No.: US 8,359,945 B2
(45) Date of Patent: Jan. 29, 2013

(54) ADJUSTABLE STEERING COLUMN ASSEMBLY

(75) Inventors: Eugene T. Tanke, Vassar, MI (US); Adrian Grigoras, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 804 days.

(21) Appl. No.: 12/108,156

(22) Filed: Apr. 23, 2008

(65) Prior Publication Data

US 2009/0266195 A1 Oct. 29, 2009

(51) Int. Cl.
*B62D 1/18* (2006.01)
*B62D 1/22* (2006.01)

(52) U.S. Cl. .............. 74/493; 74/494; 280/775

(58) Field of Classification Search ............ 74/492, 74/493, 494, 495; 280/775; 200/61.27, 61.35, 200/61.36, 61.54, 61.55, 61.56
See application file for complete search history.

(56) References Cited

U.S. PATENT DOCUMENTS

| | | | | |
|---|---|---|---|---|
| 3,444,753 A * | 5/1969 | Runkle | ............ | 74/493 |
| 3,491,614 A * | 1/1970 | Demske et al. | ............ | 74/493 |
| 4,593,577 A * | 6/1986 | Kinoshita | ............ | 74/493 |
| 4,793,204 A * | 12/1988 | Kubasiak | ............ | 74/493 |
| 5,009,120 A * | 4/1991 | Iseler et al. | ............ | 74/493 |
| 5,029,489 A * | 7/1991 | Burmeister et al. | ............ | 74/493 |
| 5,078,022 A * | 1/1992 | Ichikawa | ............ | 74/493 |
| 5,163,337 A * | 11/1992 | Herron et al. | ............ | 74/493 |
| 5,954,363 A * | 9/1999 | Cymbal et al. | ............ | 280/777 |
| 6,205,882 B1 * | 3/2001 | Jolley | ............ | 74/493 |
| 6,282,977 B1 * | 9/2001 | Satoh et al. | ............ | 74/493 |
| 6,390,505 B1 * | 5/2002 | Wilson | ............ | 280/775 |
| 6,467,367 B2 * | 10/2002 | Kim et al. | ............ | 74/493 |
| 6,591,709 B1 * | 7/2003 | Kim et al. | ............ | 74/493 |
| 6,711,965 B2 * | 3/2004 | Tomaru et al. | ............ | 74/493 |
| 7,052,043 B2 * | 5/2006 | Lee | ............ | 280/775 |
| 7,055,860 B2 | 6/2006 | Armstrong et al. | | |
| 7,090,250 B2 * | 8/2006 | Kinoshita et al. | ............ | 280/775 |
| 7,165,786 B1 * | 1/2007 | Sha et al. | ............ | 280/775 |
| 7,178,422 B2 * | 2/2007 | Armstrong et al. | ............ | 74/493 |
| 7,191,679 B2 * | 3/2007 | Tomaru et al. | ............ | 74/493 |
| 7,281,448 B2 * | 10/2007 | Li et al. | ............ | 74/493 |
| 7,331,608 B2 * | 2/2008 | Armstrong et al. | ............ | 280/775 |
| 2004/0239089 A1 * | 12/2004 | Armstrong et al. | ............ | 280/775 |
| 2005/0183534 A1 * | 8/2005 | Maida et al. | ............ | 74/492 |
| 2006/0230863 A1 | 10/2006 | Rouleau et al. | | |
| 2006/0266152 A1 * | 11/2006 | Armstrong et al. | ............ | 74/493 |
| 2006/0283281 A1 * | 12/2006 | Li et al. | ............ | 74/495 |

* cited by examiner

*Primary Examiner* — Justin Krause
*Assistant Examiner* — Adam D Rogers
(74) *Attorney, Agent, or Firm* — Cantor Colburn LLP

(57) ABSTRACT

A steering column assembly includes a column jacket adjustable in at least one of a longitudinal direction along a longitudinal axis and a tilt direction transverse to the longitudinal axis. A locking mechanism is coupled to the column jacket and is moveable between a locking position and an adjustment position. A lever is pivotably mounted to the column jacket and pivotable between a neutral position and an actuated position. The lever engages a switch when in the actuated position. The switch engages an actuator to move the locking mechanism into the adjustment position when engaged by the lever in the actuated position, thereby permitting adjustment of the column jacket in at least one of the longitudinal direction and the tilt direction. When the lever is in the neutral position, the switch does not engage the actuator, and a spring urges the locking mechanism into the locking position, thereby preventing adjustment.

15 Claims, 3 Drawing Sheets

ADJUSTABLE STEERING COLUMN ASSEMBLY

BACKGROUND OF THE INVENTION

1. Field of the Invention

The subject invention relates to a steering column assembly for a vehicle that is adjustable in at least one of a telescope direction along a longitudinal axis and a tilt direction transverse to the longitudinal axis.

2. Description of the Prior Art

Adjustable steering column assemblies typically include a telescopic adjustment as well as a tilt adjustment to position a steering wheel relative to a driver. The steering column assemblies include a lower jacket telescopically engaged with an upper jacket. The upper jacket typically moves along a longitudinal axis relative to the lower jacket. A telescope locking mechanism interconnects the upper jacket and the lower jacket, and is moveable between a telescope locking position and a telescope adjustment position. The telescope locking position prevents the longitudinal movement of the upper jacket relative to the lower jacket. The telescope adjustment position permits the longitudinal movement of the upper jacket relative to the lower jacket. The tilt adjustment may be achieved by any of several different configurations of the steering column assembly. Commonly, a tilt housing is pivotably mounted to the upper jacket. The tilt housing is pivotable about a tilt axis, the tilt axis being transverse to the longitudinal axis. A tilt locking mechanism interconnects the tilt housing and the upper jacket, and is moveable between a tilt locking position and a tilt adjustment position.

Currently, the telescope locking mechanisms and the tilt locking mechanism of the adjustable steering column assemblies are either manually operated by a mechanical linkage or are electrically operated by an electric motor controlled by a switch. An example of an adjustable steering column assembly in which the locking mechanism are manually controlled by a lever is disclosed in U.S. Patent Application Publication No. 2006/0266152 A1 to Armstrong et al. the manually controlled locking mechanisms require an excessive force to actuate, which may be difficult for some drivers. An example of an adjustable steering column assembly in which the locking mechanisms are electrically operated and controlled by a switch, typically disposed in a convenient location accessible to the driver of the vehicle, is disclosed in U.S. Pat. No. 7,055,860 to Armstrong et al. The electrically operated locking mechanisms do not provide the immediate feedback through the touch of the switch that the locking mechanism has been disengaged.

SUMMARY OF THE INVENTION AND ADVANTAGES

The subject invention provides a steering column assembly for a vehicle. The steering column assembly comprises a column jacket. The column jacket extends along a longitudinal axis. The column jacket is adjustable in at least one of a longitudinal direction along the longitudinal axis and a tilt direction transverse to the longitudinal axis. A locking mechanism is coupled to the column jacket and is moveable between a locking position and an adjustment position. The locking position prevents adjustment of the column jacket in at least one of the longitudinal direction and the tilt direction. The adjustment position permits adjustment of the column jacket in at least one of the longitudinal direction and the tilt direction. An actuator is coupled to the locking mechanism. The actuator moves the locking mechanism between the locking position and the adjustment position. A switch is mounted to the column jacket and coupled to the actuator. The switch includes a first position energizing the actuator and a second position disconnecting the actuator. A lever is pivotably mounted to the column jacket. The lever is pivotable about a pivot axis between a neutral position and an actuated position. The neutral position engages the switch in the second position to disconnect the actuator. The actuated position engages the switch in the first position to energize the actuator and move the actuator into the adjustment position, thereby permitting adjustment of the column jacket in at least one of the longitudinal direction and the tilt direction.

Accordingly, the subject invention provides an adjustable steering column assembly having an electrically actuated locking mechanism that is energized when the switch is engaged by a mechanical lever. Therefore, the steering column assembly of the subject invention provides a user with the impression and feel of a mechanically operated locking mechanism, but that requires less force to operate than an actual mechanically operated locking mechanism.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is generally shown at 20. The steering column assembly 20 is for a vehicle, and rotatably supports a steering wheel (not shown) as is well known.

Figure 1:
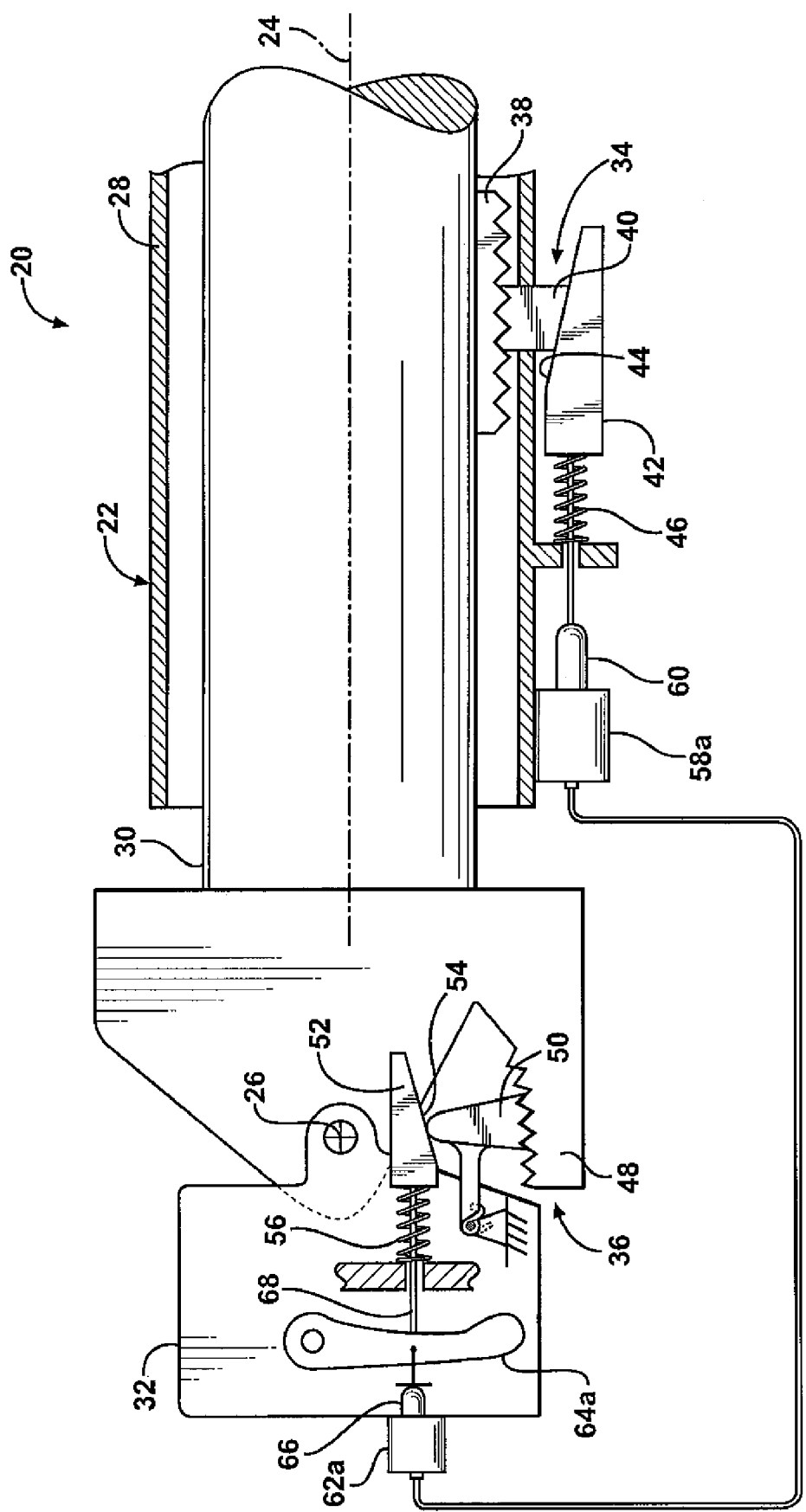
FIG. 1 is a schematic cross sectional view of a first embodiment of a steering column assembly.

Referring to FIG. 1, the steering column assembly 20 comprises a column jacket 22. The column jacket 22 extends along a longitudinal axis 24. The column jacket 22 is adjustable in at least one of a longitudinal direction along the longitudinal axis 24 and a tilt direction about a tilt axis 26, transverse to the longitudinal axis 24. The column jacket 22 includes a lower jacket 28 and an upper jacket 30. The upper jacket 30 is telescopically engaged with and longitudinally moveable relative to the lower jacket 28 along the longitudinal axis 24 to adjust the column jacket 22 in the longitudinal direction. A tilt housing 32 is pivotably mounted to the upper jacket 30. The tilt housing 32 is pivotably moveable about the tilt axis 26 relative to the upper jacket 30 to adjust the column jacket 22 in the tilt direction.

A locking mechanism 34, 36 is coupled to the column jacket 22. The locking mechanism 34, 36 is moveable between a locking position and an adjustment position. The locking position prevents adjustment of the column jacket 22 in at least one of the longitudinal direction and the tilt direction. The adjustment position permits adjustment of the column jacket 22 in at least one of the longitudinal direction and the tilt direction.

Preferably, the locking mechanism 34, 36 includes a telescope locking mechanism 34 and a tilt locking mechanism 36. It should be appreciated that each of the telescope locking mechanism 34 and the tilt locking mechanism 36 are moveable between the locking position and the adjustment position. The locking position of the telescope locking mechanism 34 prevents the longitudinal movement of the upper jacket 30 relative to the lower jacket 28. The adjustment position of the telescope locking mechanism 34 permits the longitudinal movement of the upper jacket 30 relative to the lower jacket 28. Likewise, the locking position of the tilt locking mechanism 36 prevents the movement of the tilt housing 32 in the tilt direction relative to the upper jacket 30, and the adjustment position of the tilt locking mechanism 36 permits the movement of the tilt housing 32 in the tilt direction relative to the upper jacket 30.

The telescope locking mechanism 34 includes a first telescope locking member 38. The first telescope locking member 38 includes teeth, and is mounted to the upper jacket 30. Accordingly, the upper jacket 30 and the first telescope locking member 38 are moveable relative to the lower jacket 28. A second telescope locking member 40 is coupled to the lower jacket 28. The second telescope locking member 40 also includes teeth. The teeth of the second telescope locking member 40 engage the teeth of the first telescope locking member 38 in interlocking engagement when the telescope locking mechanism 34 is in the locking position. The teeth of the second telescope locking member 40 are disengaged from the teeth of the first telescope locking member 38 when the telescope locking mechanism 34 is in the adjustment position. Accordingly, the second telescope locking member 40 is moveable into and out of engagement with the first telescope locking member 38. The second telescope locking member 40 may be coupled in any suitable manner to the lower jacket 28 to move into and out of engagement with the first telescope locking member 38 mounted to the upper jacket 30.

The telescope locking mechanism 34 includes a telescope wedge 42. The telescope wedge 42 includes a telescope ramp 44. The telescope ramp 44 engages the second telescope locking member 40. The second telescope locking member 40 is moveable along the telescope ramp 44 relative to the lower jacket 28, thereby moving the second telescope locking member 40 into and out of interlocking engagement with the first telescope locking member 38. It should be appreciated that as the second telescope locking member 40 moves up the telescope ramp 44, the second telescope locking member 40 moves closer to and into interlocking engagement with the first telescope locking member 38. Similarly, as the second telescope locking member 40 moves down the telescope ramp 44, the second telescope locking member 40 moves farther from the first telescope locking member 38 and out of interlocking engagement with the first telescope locking member 38.

The telescope locking mechanism 34 includes a telescope spring 46. The telescope spring 46 is coupled to the upper jacket 30 and also coupled to the telescope wedge 42. The telescope wedge 42 is moveable with the telescope spring 46, i.e., as the telescope spring 46 expands or contracts along a spring axis, the telescope wedge 42 moves with the telescope spring 46 along the spring axis a distance equal to that of the telescope spring 46. The telescope spring 46 urges the second telescope locking member 40 along the telescope ramp 44 into interlocking engagement with the first telescope locking member 38. In other words, the telescope spring 46 pushes or biases against the telescope wedge 42 to move the telescope wedge 42 relative to the second telescope locking member 40. In doing so, the second telescope locking member 40 moves up the ramp, into interlocking engagement with the first telescope locking member 38. Accordingly, the telescope spring 46 provides a positive lock, i.e., the telescope spring 46 ensures that the telescope locking mechanism 34 is always in the locking position, unless the user actively moves the telescope locking mechanism 34 into the adjustment position.

As described above, the tilt locking mechanism 36 interconnects the tilt housing 32 and the upper jacket 30. The locking position of the tilt locking mechanism 36 prevents the pivotable movement of the tilt housing 32 relative to the upper jacket 30. The adjustment position of the tilt locking mechanism 36 permits the pivotable movement of the tilt housing 32 relative to the upper jacket 30.

The tilt locking mechanism 36 includes a first tilt locking member 48. The first tilt locking member 48 includes teeth, and is fixedly mounted to the upper jacket 30. Accordingly, the tilt housing 32 moves or pivots about the tilt axis 26 relative to both the first tilt locking member 48 and the upper jacket 30. A second tilt locking member 50 is coupled to the tilt housing 32. The second tilt locking member 50 also includes teeth. The teeth of the second tilt locking member 50 engage the teeth of the first tilt locking member 48 in interlocking engagement when the tilt locking mechanism 36 is in the locking position. The teeth of the second tilt locking member 50 are disengaged from the teeth of the first tilt locking member 48 when the tilt locking mechanism 36 is in the adjustment position. Accordingly, the second tilt locking member 50 is moveable into and out of engagement with the first tilt locking member 48. The second tilt locking member 50 may be coupled to the tilt housing 32 in any suitable manner to be pivotably moveable with the tilt housing 32 about the tilt axis 26 and moveable relative to the tilt housing 32 to move into and out of engagement with the first tilt locking member 48 mounted to the upper jacket 30.

The tilt locking mechanism 36 includes a tilt wedge 52. The tilt wedge 52 includes a tilt ramp 54. The tilt ramp 54 engages the second tilt locking member 50. The second tilt locking member 50 is moveable along the tilt ramp 54 relative to the upper jacket 30, thereby moving the second tilt locking member 50 into and out of interlocking engagement with the first tilt locking member 48. It should be appreciated that as the second tilt locking member 50 moves up the tilt ramp 54, the second tilt locking member 50 moves closer to and into interlocking engagement with the first tilt locking member 48. Similarly, as the second tilt locking member 50 moves down the tilt ramp 54, the second tilt locking member 50 moves farther from the first tilt locking member 48 and out of interlocking engagement with the first tilt locking member 48.

The tilt locking mechanism 36 includes a tilt spring 56. The tilt spring 56 is coupled to the tilt housing 32 and also coupled to the tilt wedge 52. The tilt wedge 52 is moveable with the tilt spring 56, i.e., as the tilt spring 56 expands or contracts along a spring axis, the tilt wedge 52 moves with the tilt spring 56 along the spring axis a distance equal to that of the tilt spring 56. The tilt spring 56 urges the second tilt locking member 50 along the tilt ramp 54 into interlocking engagement with the first tilt locking member 48. In other words, the tilt spring 56 pushes or biases against the tilt wedge 52 to move the tilt wedge 52 relative to the second tilt locking member 50. In doing so, the second tilt locking member 50 moves up the ramp, into interlocking engagement with the first tilt locking member 48. Accordingly, the tilt spring 56 provides a positive lock, i.e., the tilt spring 56 ensures that the tilt locking mechanism 36 is always in the locking position, unless the user actively moves the tilt locking mechanism 36 into the adjustment position.

The steering column assembly 20 of the subject invention further comprises an actuator 58A. The actuator 58A is coupled to the locking mechanism. The actuator 58A moves the locking mechanism between the locking position and the adjustment position. As shown in the first embodiment of the steering column assembly 20 in FIG. 1, the actuator 58A is coupled to the telescope locking mechanism 34. More specifically, the actuator 58A is coupled to the telescope spring 46. The actuator 58A may include a solenoid or some other similar device that includes an arm 60 moveable along an axis from an initial position when energized. When energized, the actuator 58A compresses the telescope spring 46. As the telescope spring 46 is coupled to the telescope wedge 42, the telescope spring 46 moves the telescope wedge 42 as the telescope spring 46 is compressed by the actuator 58A. As the telescope wedge 42 moves, the second telescope locking member 40 moves down the telescope ramp 44 out of engagement with the first telescope locking member 38, thereby permitting adjustment of the upper jacket 30 relative to the lower jacket 28. When the actuator 58A is de-energized or disconnected, the arm 60 of the actuator 58A returns to the initial position, thereby allowing the telescope spring 46 to return to a fully expanded condition. As the telescope wedge 42 is moveable with the telescope spring 46, the telescope wedge 42 moves relative to the second telescope locking member 40, thereby driving the second telescope locking member 40 up the telescope ramp 44 and into interlocking engagement with the first telescope locking member 38.

A switch 62A is mounted to the column jacket 22 and coupled to the actuator 58A. Preferably, the switch 62A is coupled to the actuator 58A by electrical wiring to complete a circuit between the switch 62A and the actuator 58A. However, it should be appreciated that the switch 62A may be coupled to the actuator 58A in some other suitable manner, such as by a wireless communication system or the like. The switch 62A includes a first position and a second position. The first position energizes the actuator 58A to compress the telescope spring 46 as described above. The second position disconnects or de-energizes the actuator 58A, thereby permitting the telescope spring 46 to return to the fully expanded condition.

A lever 64A is pivotably mounted to the column jacket 22. The lever 64A is pivotable about a pivot axis between a neutral position and an actuated position. The neutral position of the lever 64A engages the switch 62A in the second position, thereby disconnecting the actuator 58A, i.e., not energizing the actuator 58A. The actuated position of the lever 64A engages the switch 62A in the first position, thereby energizing the actuator 58A and moving the actuator 58A and thereby the telescope locking mechanism 34 into the adjustment position to permit adjustment of the column jacket 22 in at least one of the longitudinal direction and the tilt direction.

Preferably, the switch 62A includes a plunger 66 abutting the lever 64A. The plunger 66 is responsive to the pivotable movement of the lever 64A to move the switch 62A between the first position and the second position. Accordingly, the plunger 66 moves with the lever 64A as the lever 64A rotates between the neutral position and the actuated position. As such, as the lever 64A is in the neutral position, the plunger 66 abuts the lever 64A and the switch 62A remains in the second position, i.e., the actuator 58A is de-energized or disconnected. Upon rotating the lever 64A about the pivot axis into the actuated position, the plunger 66 is depressed, thereby moving the switch 62A from the second position into the first position and energizing the actuator 58A. Upon releasing the lever 64A, the lever 64A returns to the neutral position, with the plunger 66 moving with the lever 64A. As the plunger 66 moves with the lever 64A back into the neutral position, the switch 62A returns to the second position, thereby de-energizing or disconnecting the actuator 58A.

A mechanical linkage 68 operatively interconnects the tilt locking mechanism 36 and the lever 64A. The mechanical linkage 68 moves the tilt locking mechanism 36 between the locking position and the adjustment position in response to movement, i.e., rotation about the pivot axis, of the lever 64A between the neutral position and the actuated position. Accordingly, as the lever 64A is rotated from the neutral position into the actuated position, the mechanical linkage 68 compresses the tilt spring 56. As the tilt spring 56 is coupled to the tilt wedge 52, the tilt spring 56 moves the tilt wedge 52 as the tilt spring 56 is compressed by the rotation of the lever 64A. As the tilt wedge 52 moves, the second tilt locking member 50 moves down the tilt ramp 54 out of engagement with the first tilt locking member 48, thereby permitting adjustment of the tilt housing 32 relative to the upper jacket 30. as the lever 64A rotates from the actuated position into the neutral position, the mechanical linkage 68 allows the tilt spring 56 to return to a fully expanded condition. As the tilt wedge 52 is moveable with the tilt spring 56, the tilt wedge 52 moves relative to the second tilt locking member 50, thereby driving the second tilt locking member 50 up the tilt ramp 54 and into interlocking engagement with the first tilt locking member 48.

The steering column assembly 20 is shown in FIG. 1 and described above to include the actuator 58A coupled to the telescope locking mechanism 34, with the lever 64A and the switch 62A operable to electrically control the telescope locking mechanism 34 and the lever 64A and the mechanical linkage 68 mechanically operable to control the tilt locking mechanism 36. However, it should be appreciated that the actuator 58A may alternatively be coupled to the tilt locking mechanism 36, with the lever 64A and the switch 62A operable to electrically control the tilt locking mechanism 36 and the lever 64A and the mechanical linkage 68 mechanically operable to control the telescope locking mechanism 34. It should also be appreciated that the lever 64A, the switch 62A, and the mechanical linkage 68 may be coupled to any part of the steering column assembly 20, and are most preferably coupled and mounted to either the tilt housing 32 or the upper jacket 30.

Figure 2:
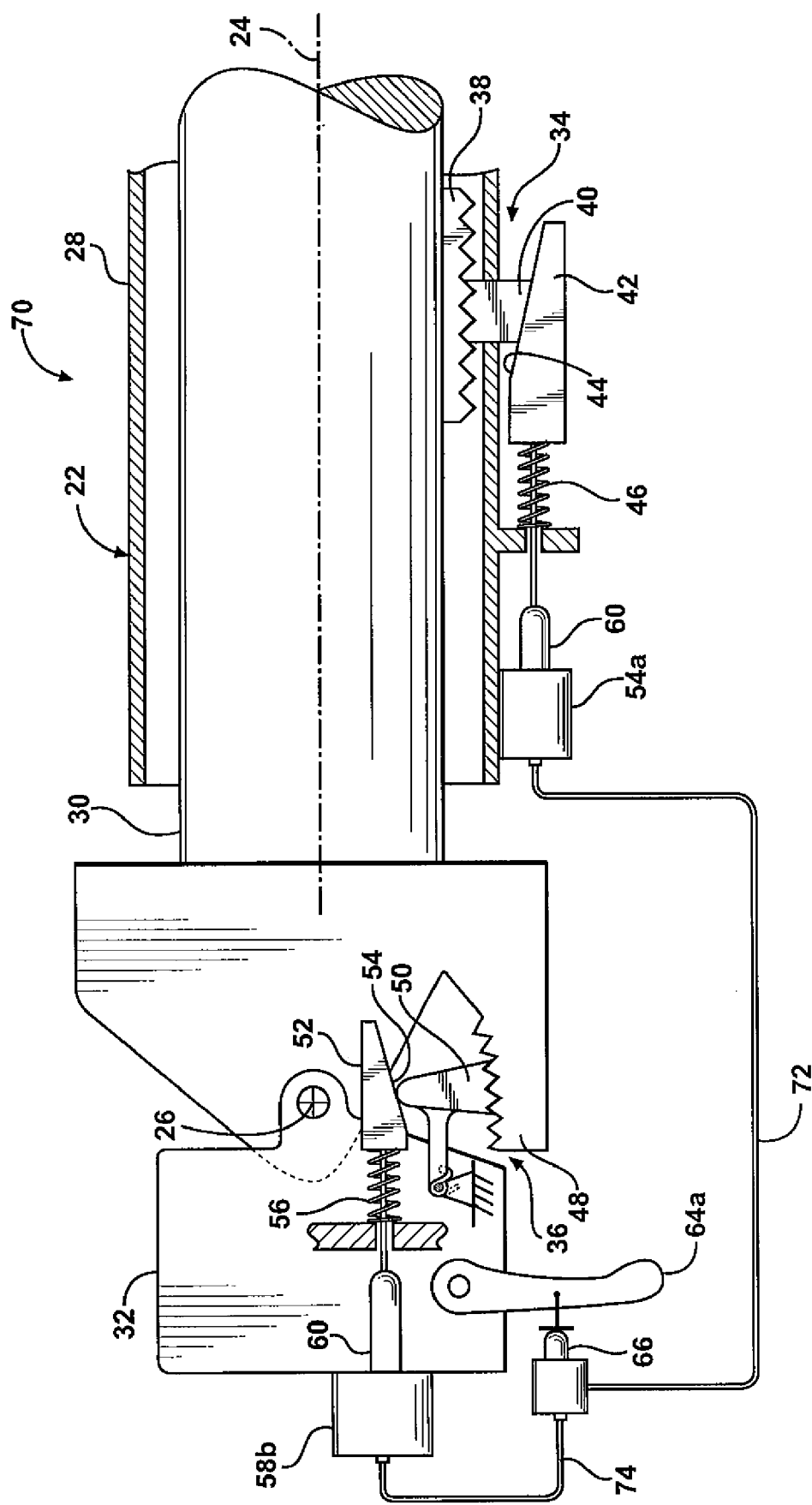
FIG. 2 is a schematic cross sectional view of a second embodiment of the steering column assembly.

Referring to FIG. 2, a second embodiment of the steering column assembly 70 is shown. The second embodiment of the steering column assembly 70 includes the actuator 58A, 58B including a tilt actuator 58B and a telescope actuator 58A. The tilt actuator 58B is coupled to the tilt locking mechanism 36. The telescope actuator 58A is coupled to the telescope locking mechanism 34. In the second embodiment of the steering column assembly 70, both the tilt locking mechanism 36 and the telescope locking mechanism 34 are electrically controlled by rotation of the lever 64A between the neutral position and the actuated position, and there is no mechanical linkage 68 interconnecting the lever 64A and one of the tilt locking mechanism 36 and the telescope locking mechanism 34. The switch 62A includes a first circuit 72 coupled to the telescope actuator 58A and a second circuit 74 coupled to the tilt actuator 58B. As described above, the switch 62A preferably includes electrical wiring interconnecting the switch 62A and the tilt actuator 58B and the telescope actuator 58A to complete the first circuit 72 and the second circuit 74. However, it should be appreciated that a wireless communication system may alternatively be utilized to interconnect the switch 62A with the tilt actuator 58B and the telescope actuator 58A to complete the first circuit 72 and the second circuit 74.

Figure 3:
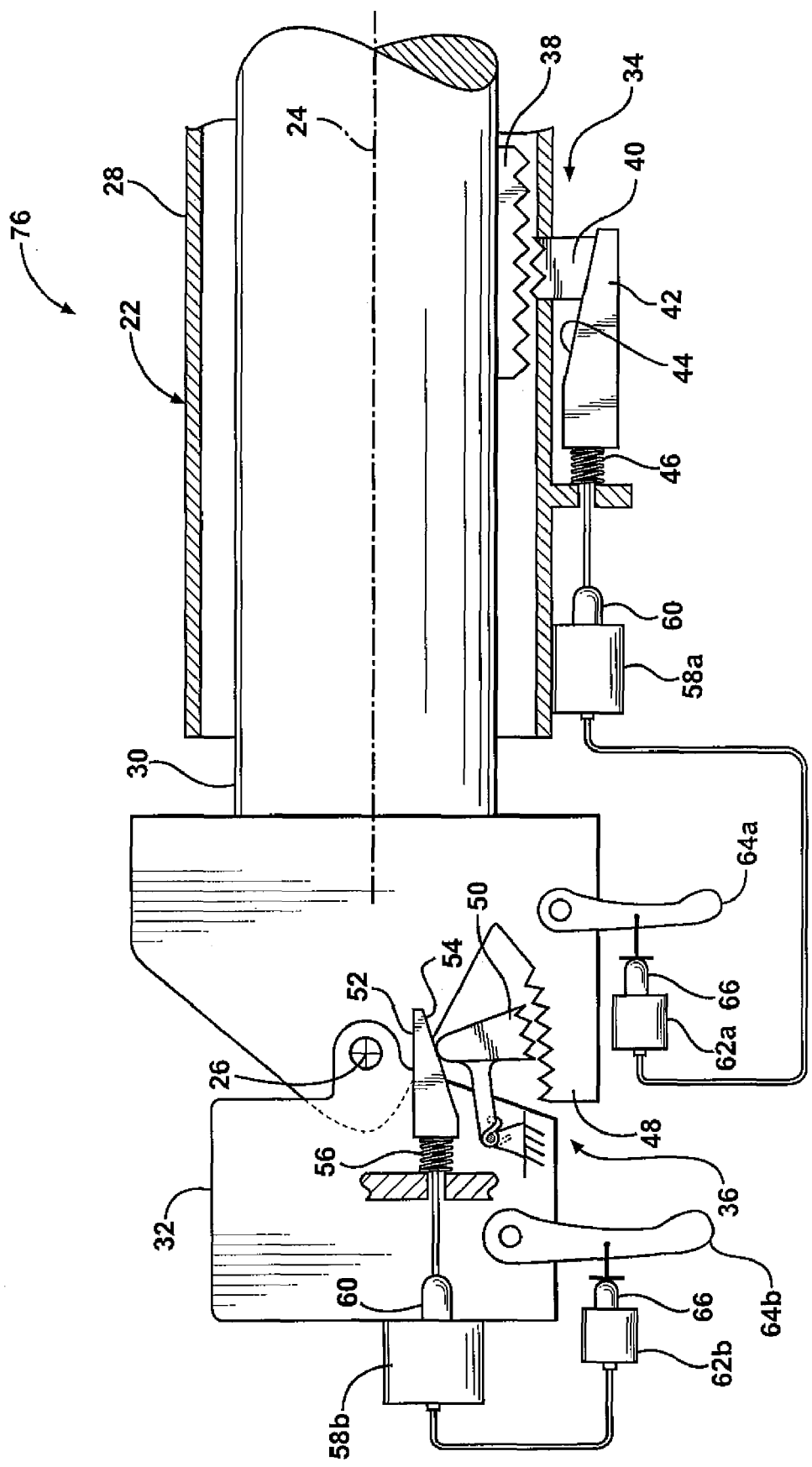
FIG. 3 is a schematic cross sectional view of a third embodiment of the steering column assembly.

Referring to FIG. 3, a third embodiment of the steering column assembly 76 is shown. The Third embodiment of the steering column assembly 76 includes the actuator 58A, 58B including a tilt actuator 58B and a telescope actuator 58A. The tilt actuator 58B is coupled to the tilt locking mechanism 36. The telescope actuator 58A is coupled to the telescope locking mechanism 34. The lever 64A, 64B includes a telescope lever 64A and a tilt lever 64B. Both the telescope lever 64A and the tilt lever 64B include and are rotatable about their own respective pivot axis between the neutral position and the actuated position, i.e., the tilt lever 64B is rotatable about the pivot axis between the neutral position and the actuated position and the telescope lever 64A is rotatable about the pivot axis between the neutral position and the actuate position. In the third embodiment of the steering column assembly 76, the tilt locking mechanism 36 is electrically controlled by rotation of the tilt lever 64B between the neutral position and the actuated position of the tilt lever 64B. Likewise, the telescope locking mechanism 34 is electrically controlled by rotation of the telescope lever 64A between the neutral position and the actuated position of the telescope lever 64A. Therefore, there is no mechanical linkage 68 interconnecting the lever 64A, 64B and one of the tilt locking mechanism 36 and the telescope locking mechanism 34. Furthermore, the third embodiment of the steering column assembly 76 includes the switch 62A, 62B having a telescope switch 62A and a tilt switch 62B. The telescope lever 64A is coupled to the telescope switch 62A and the tilt lever 64B is coupled to the tilt switch 62B, with the telescope switch 62A coupled to the telescope actuator 58A and the tilt switch 62B coupled to the tilt actuator 58B. Accordingly, it should be appreciated that the third embodiment of the steering column assembly 76 includes two separate adjustment systems for individually locking and unlocking the tilt locking mechanism 36 and the telescope locking mechanism 34.

Upon rotating the telescope lever 64A from the neutral position into the actuated position, the telescope switch 62A energizes the telescope actuator SA. The telescope actuator 58A thereby compresses the telescope spring 46 when engaged by the telescope switch 62A to move the telescope wedge 42 relative to the second telescope locking member 40 to move the second telescope locking member 40 along the telescope ramp 44 into the telescope adjustment position. As the tilt locking mechanism 36 is not connected to or operatively controlled in any way by the telescope lever 64A, the tilt locking mechanism 36 is not affected by rotation of the telescope lever 64A. Similarly, upon rotation of the tilt lever 64B from the neutral position into the actuate position; the tilt switch 62B energizes the tilt actuator 58B. The tilt actuator 58B thereby compresses the tilt spring 56 when engaged by the tilt switch 62B to move the tilt wedge 52 relative to the second tilt locking member 50 to move the second tilt locking member 50 along tilt ramp 54 into the tilt adjustment position. As the telescope locking mechanism 34 is not connected to or operatively controlled in any way by the tilt lever 64B, the telescope locking mechanism 34 is not affected by rotation of the tilt lever 64B.

The features and operation of the tilt locking mechanism 36 and the telescope locking mechanism 34 have been described above. However, it should be appreciated that one of both of the tilt locking mechanism 36 and the telescope locking mechanism 34 may include different types or configurations of locking mechanisms suitable for selectively locking and unlocking the tilt housing 32 relative to the upper jacket 30 and the upper jacket 30 relative to the lower jacket 28 respectively. Similarly, the construction of the column jacket 22 as described above may also vary, may include other possible configurations, orientations and constructions of the upper jacket 30 and the lower jacket 28 and may include the upper jacket 30 and the lower jacket 28 being pivotable about the tilt axis 26.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:

a column jacket extending along a longitudinal axis and adjustable in at least one of a longitudinal direction along said longitudinal axis and a tilt direction transverse to said longitudinal axis;

a locking mechanism coupled to said column jacket and moveable between a locking position preventing adjustment of said column jacket in at least one of said longitudinal direction and said tilt direction and an adjustment position permitting adjustment of said column jacket in at least one of said longitudinal direction and said tilt direction;

a spring coupled to the column jacket, the spring being positioned and configured so as to push against the locking mechanism so as to bias the locking mechanism into the locking position;

an actuator coupled to said locking mechanism for moving said locking mechanism, in opposition to the force exerted by the spring, from said locking position to said adjustment position;

a switch mounted to said column jacket and coupled to said actuator and including a first position energizing said actuator and a second position disconnecting said actuator; and a lever pivotably mounted to said column jacket and pivotable about a pivot axis between a neutral position engaging said switch in said second position to disconnect said actuator and an actuated position engaging switch in said first position to energize said actuator so as to cause said actuator to compress said spring while simultaneously moving said locking mechanism into said adjustment position to permit adjustment of said column jacket in at least one of said longitudinal direction and said tilt direction;

wherein said locking mechanism comprises a first locking member, a second locking member, and a wedge for moving said second locking member into and out of interlocking engagement with said first locking member;

wherein said first locking member is mounted to said column jacket and has teeth disposed along an adjustment direction that is parallel to either said longitudinal direction or said tilt direction;

wherein said second locking member resides at a fixed position along the adjustment direction and is movable along a linear path that is perpendicular to the adjustment direction into and out of interlocking engagement with said first locking member;

wherein said second locking member has teeth that engage said teeth of said first locking member when in said locking position and that disengage from said teeth of said first locking member when in said adjustment position;

wherein said wedge has a ramp engaging said second locking member so as to move said second locking member into and out of interlocking engagement with said first locking member as said wedge moves parallel to said adjustment direction; and wherein said column jacket includes a lower jacket and an upper jacket telescopically engaged with, and longitudinally moveable relative to, said lower jacket along said longitudinal axis;

further comprising a tilt housing pivotably mounted to said upper jacket and pivotably moveable about a tilt axis relative to said upper jacket;

wherein said locking mechanism includes a tilt locking mechanism interconnecting said tilt housing and said upper jacket, with said locking position preventing said pivotable movement of said tilt housing relative to said upper jacket, and with said adjustment position permitting said pivotable movement of said tilt housing relative to said upper jacket;

wherein said actuator comprises a tilt actuator coupled to said tilt locking mechanism and a telescope actuator coupled to said telescope locking mechanism; and wherein said tilt locking mechanism includes a first tilt locking member having teeth and mounted to said upper jacket and a second tilt locking member coupled to said tilt housing and having teeth engaging said teeth of said first tilt locking member in interlocking engagement when said tilt locking mechanism is in said locking position and disengaged from said teeth of said first tilt locking member when said tilt locking mechanism is in said adjustment position.

2. An assembly as set forth in claim 1 wherein said switch includes a plunger abutting said lever and responsive to said pivotable movement of said lever to move said switch between said first position and said second position.

3. An assembly as set forth in claim 1 wherein said locking mechanism includes a telescope locking mechanism with said locking position preventing said longitudinal movement of said upper jacket relative to said lower jacket and said adjustment position permitting said longitudinal movement of said upper jacket relative to said lower jacket.

4. An assembly as set forth in claim 3 wherein said telescope locking mechanism includes a first telescope locking member having teeth and mounted to said upper jacket and a second telescope locking member coupled to said lower jacket and having teeth engaging said teeth of said first telescope locking member in interlocking engagement when in said locking position and disengaged from said teeth of said first telescope locking member when in said adjustment position.

5. An assembly as set forth in claim 4 wherein said telescope locking mechanism includes a telescope wedge having a telescope ramp engaging said second telescope locking member with said second telescope locking member moveable along said telescope ramp relative to said lower jacket to move said second telescope locking member into and out of interlocking engagement with said first telescope locking member.

6. An assembly as set forth in claim 5 wherein said spring is coupled to said telescope wedge to urge said second telescope locking member along said telescope ramp into interlocking engagement with said first telescope locking member.

7. An assembly as set forth in claim 6 wherein said actuator compresses said spring when engaged by said switch to move said telescope wedge relative to said second telescope locking member to move said second telescope locking member along said telescope ramp into said adjustment position.

8. An assembly as set forth in claim 1 wherein said switch includes a first circuit coupled to said telescope actuator and a second circuit coupled to said tilt actuator.

9. An assembly as set forth in claim 1 wherein said tilt locking mechanism includes a tilt wedge having a tilt ramp engaging said second tilt locking member with said second tilt locking member moveable along said tilt ramp relative to said upper jacket to move said second tilt locking member into and out of interlocking engagement with said first tilt locking member.

10. An assembly as set forth in claim 9 wherein said spring is coupled to said tilt wedge to urge said second tilt locking member along said tilt ramp into interlocking engagement with said first tilt locking member.

11. An assembly as set forth in claim 1, wherein said spring defines a spring axis, wherein at least a portion of said actuator is positioned coaxially with said spring axis such that, as said actuator moves said locking mechanism from said locking position to said adjustment position, at least a portion of said locking mechanism moves along said spring axis a distance equal to the extent to which the spring is compressed.

12. An assembly as set forth in claim 1, wherein said second locking member is movable into and out of interlocking engagement with said first locking member transversely to said adjustment direction.

13. An assembly as set forth in claim 1, wherein said second locking member is coupled to said lower jacket so as to prevent said second locking member from moving relatively to said lower jacket parallel to said adjustment direction.

14. An assembly as set forth in claim 1, wherein said spring is arranged so as to bias said wedge parallel to said adjustment direction such that said ramp engages said second locking member so as to move said second locking member into interlocking engagement with said first locking member.

15. An assembly as set forth in claim 1, wherein said second locking member has a first surface that is planar and that is arranged at an angle relatively to the adjustment direction, wherein said ramp of said wedge defines a second surface that is planar and that is parallel to said first surface, and wherein said second surface engages said first surface to move said second locking member into and out of interlocking engagement with said first locking member as said wedge moves parallel to said adjustment direction.

* * * * *